US012553260B2

(12) United States Patent
Gosling et al.

(10) Patent No.: US 12,553,260 B2
(45) Date of Patent: Feb. 17, 2026

(54) BATTERY POWERED SELF-STORAGE LOCK

(71) Applicant: JANUS INTERNATIONAL GROUP, LLC, Temple, GA (US)

(72) Inventors: Jake Gosling, Eagle Mountain, UT (US); Matthew Bettridge, Saratoga Springs, UT (US)

(73) Assignee: Janus International Group, LLC, Temple, GA (US)

(*) Notice: Subject to any disclaimer, the term of this patent is extended or adjusted under 35 U.S.C. 154(b) by 31 days.

(21) Appl. No.: 18/497,118

(22) Filed: Oct. 30, 2023

(65) Prior Publication Data

US 2025/0137294 A1 May 1, 2025

(51) Int. Cl.
*E05B 41/00* (2006.01)
*E05B 47/00* (2006.01)
*E05B 65/00* (2006.01)

(52) U.S. Cl.
CPC .......... *E05B 41/00* (2013.01); *E05B 47/0001* (2013.01); *E05B 2047/0069* (2013.01); *E05B 65/0021* (2013.01)

(58) Field of Classification Search
None
See application file for complete search history.

(56) References Cited

U.S. PATENT DOCUMENTS

2014/0225382 A1* 8/2014 Kurita .................... E05B 81/20 292/201
2017/0116802 A1 4/2017 Handville et al.
2019/0088048 A1* 3/2019 Minsley .................. G07C 9/21
2019/0289553 A1 9/2019 Kincaid et al.
2020/0242868 A1 7/2020 Gengler et al.
2020/0327757 A1* 10/2020 Kelley ............... G07C 9/00309
2023/0077654 A1 3/2023 Mantena et al.
2023/0287711 A1* 9/2023 Chiti ...................... E05B 63/18
2023/0304319 A1 9/2023 Kuenzi et al.

FOREIGN PATENT DOCUMENTS

EP 2348490 B1 3/2020

OTHER PUBLICATIONS

International Search Report & Written Opinion in PCT/US2023/036236 mailed Feb. 8, 2024.

* cited by examiner

*Primary Examiner* — Thomas S McCormack
(74) *Attorney, Agent, or Firm* — Barnes & Thornburg LLP

(57) ABSTRACT

A storage security door system includes a storage security door and a lock secured to a portion of the security door. The lock has a latch selectively operable between a locked position to block against opening of the door and an unlocked position to allow the storage security door to be opened for access to storage. A wake button can be activated to raise alertness of the lock for operation from a less-powered state.

19 Claims, 6 Drawing Sheets

BATTERY POWERED SELF-STORAGE LOCK

FIELD

The present disclosure relates generally to devices, systems, and methods for security, and more particularly to devices, systems, and methods for storage facility security.

Physical security, for example, for storage facilities can present interesting challenges for appropriate access to the storage. For security storage doors which can require access by various parties, maintaining permissions to access the secured storage can be cumbersome. For example, in owner-tenant relationships, access and/or infrastructure to support access can be complex.

SUMMARY

According to an aspect of the present disclosure, a storage lock for a corrugated storage door may include a lock housing for mounting to the storage door or to a storage frame supporting the storage door; and a lock mechanism arranged within the lock housing. The lock mechanism may include a latch selectively operable between a locked position in which the latch is extended to engage with the other of the storage door and storage frame to block against opening of the storage door, and an unlocked position in which the latch is retracted to disengage from the other of the storage door and storage frame to allow the storage door to be opened for access to storage, and a communication system selectively operable between a communication mode in which the communication system communicates with a network to permit remote communication for a status of the lock and a hibernation mode in which the communication system is blocked from communicating with the network. The communication system may include a wake button configured to, when activated, switch the communication system from the hibernation mode to the communication mode.

In some embodiments, the communication system may be selectively operable in a sleep mode. In the sleep mode, the communication system may operate at a power lower than the power in the communication mode but higher than the power in the hibernation mode. The storage lock may further include a status indicator coupled with the lock housing and communicable with the communication system, the status indicator being configured to display the status of the storage lock. The status indicator may communicate (e.g., display, indicate) the status of the storage lock in each of the communication mode and the hibernation mode.

In some embodiments, the communication system may include a sensor communicable with the communication system to communicate whether the latch is in the locked position or the unlocked position. The status of the storage lock may include at least one of: the mode that the communication system is in, the position that the latch is in, and/or whether the communication system is connected to the network.

In some embodiments, the wake button may be a button coupled with the lock housing of the storage lock and operable by a user. The communication system may include a controller having a processor and a memory storing instructions to, when executed by the processor, communicate the status of the lock to the network when the communication system is in the communication mode. The storage lock may further comprise a status indicator coupled with the lock housing. The status indicator may be configured to display the status of the storage lock. The memory may further store instructions to, when executed by the processor, communicate the status of the lock to the status indicator when the communication system is in each of the communication mode and the hibernation mode. Communicating no information may indicate a particularly status in some embodiments.

In some embodiments, the communication system may include a sensor configured to detect whether the latch is in the locked position or the unlocked position. The memory may further store instructions to, when executed by the processor, switch the communication system from the communication mode to the hibernation mode after a predetermined amount of time has passed since the latch was switched into the locked position.

According to another aspect of the present disclosure, a storage security door system may include a storage security door including a door and a frame; and, a lock secured with one of the door and the frame. The lock may include a latch selectively operable between a locked position in which the latch is engaged with the other of the door and the frame to block against opening of the door, and an unlocked position in which the latch is disengaged from the other of the door and the frame to allow the storage security door to be opened for access to storage. The system may include a communication system selectively operable between a communication mode in which the communication system communicates with a network to permit remote communication and a sleep mode in which the communication system is blocked from communicating with the network.

In some embodiments, the communication system may include a wake button configured to, when activated, change (switch) the communication system from the sleep mode to the communication mode. The lock may further include a status indicator coupled with the lock housing and communicable with the communication system. The status indicator may be configured to display the status of the lock.

In some embodiments, the status indicator displays the status of the lock in each of the communication mode and the sleep mode. The wake button may be a button coupled with the lock housing of the lock and operable by a user. In some embodiments, the communication system may include a controller having a processor and a memory storing instructions to, when executed by the processor, communicate the status of the lock to the network when the communication system is in the communication mode.

In some embodiments, the lock may further include a status indicator coupled with the lock housing. The status indicator may be configured to display the status of the lock. The memory may further store instructions to, when executed by the processor, communicate the status of the lock to the status indicator when the communication system is in each of the communication mode and the hibernation mode. In some embodiments, the communication system includes sensor configured to detect whether the latch is in the locked position or the unlocked position. In some embodiments, the memory may further store instructions to, when executed by the processor, switch the communication system from the communication mode to the hibernation mode after a predetermined amount of time has passed since the latch was switched into the locked position.

According to another aspect of the present disclosure, a storage lock for a corrugated storage door may include a latch selectively operable between a locked position in which the latch is engaged with a storage frame supporting a storage door to block against opening of the storage door, and an unlocked position in which the latch is disengaged from the storage frame to allow the storage door to be opened for access to storage, a latch system selectively operable between a restricted position to block against operation of the latch from the locked position, and an unrestricted position to permit operation of the latch out from the locked position to the unlocked position, the latch system including a controller and a latch operator, the controller configured to issue instructions to the latch operator to selectively operate the latch system between the restricted position and the unrestricted position, and a lock power system. The lock power system may be selectively operable between an operation mode to permit the latch system to operate between the restricted position and the unrestricted position, and a hibernation mode to block the latch system from operating between the restricted position and the unrestricted position. The lock power system may include a wake button configured to, when activated by a user, switch the lock power system from the hibernation mode to the operation mode.

In some embodiments, the latch system may further include a key selectively operable between blocked and unblocked positions corresponding with the restricted and unrestricted positions of the latch system. In the blocked position, the key may be arranged to engage the latch to block movement of the latch out from the locked position to the unlocked position. In the unblocked position, the key may be arranged disengaged from the latch to permit movement of the latch out from the locked position to the unlocked position.

In some embodiments, the latch system may further include a restrictor selectively operable between restricted and unrestricted positions. In the restricted position the restrictor may be arranged to engage the key to block movement of the key out from the blocked position. The latch operator may include an actuator and a connector engaged between the actuator and the restrictor to transmit actuation force from the actuator to the restrictor to drive movement of the restrictor from the restricted position to the unrestricted position.

In some embodiments, the lock power system may further include a status indicator configured to display a status of the storage lock in each of the operation mode and the hibernation mode. The lock power system may further include a sensor coupled with the latch system to communicate whether the latch system is in the restricted position or the unrestricted position.

In some embodiments, the lock power system may be configured to switch from the operation mode to the hibernation mode after a predetermined amount of time has passed since the latch system was switched to the restricted position. The lock power system may further include a sensor coupled with the latch to communicate whether the latch is in the locked position or the unlocked position. The lock power system may be configured to switch from the operation mode to the hibernation mode after a predetermined amount of time has passed since the latch was switched to the locked position.

In some embodiments, the storage lock may further include a communication system comprising the lock power system. The communication system may be selectively operable between a communication mode in which the communication system communicates with a network external to the storage lock to permit remote communication for a status of the lock and a hibernation mode in which the communication system is blocked from communicating with the network, wherein the communication mode coincides with the operation mode the lock control system and the hibernation mode coincides with the hibernation mode of the lock control system.

In some embodiments, the wake button is configured to, when activated, switch the communication system from the hibernation mode to the communication mode. The communication system may be configured to switch from the communication mode to the hibernation mode when the lock power system switches to the hibernation mode.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The drawings disclose exemplary embodiments in which like reference characters designate the same or similar parts throughout the figures of which.

DETAILED DESCRIPTION

Figure 1:
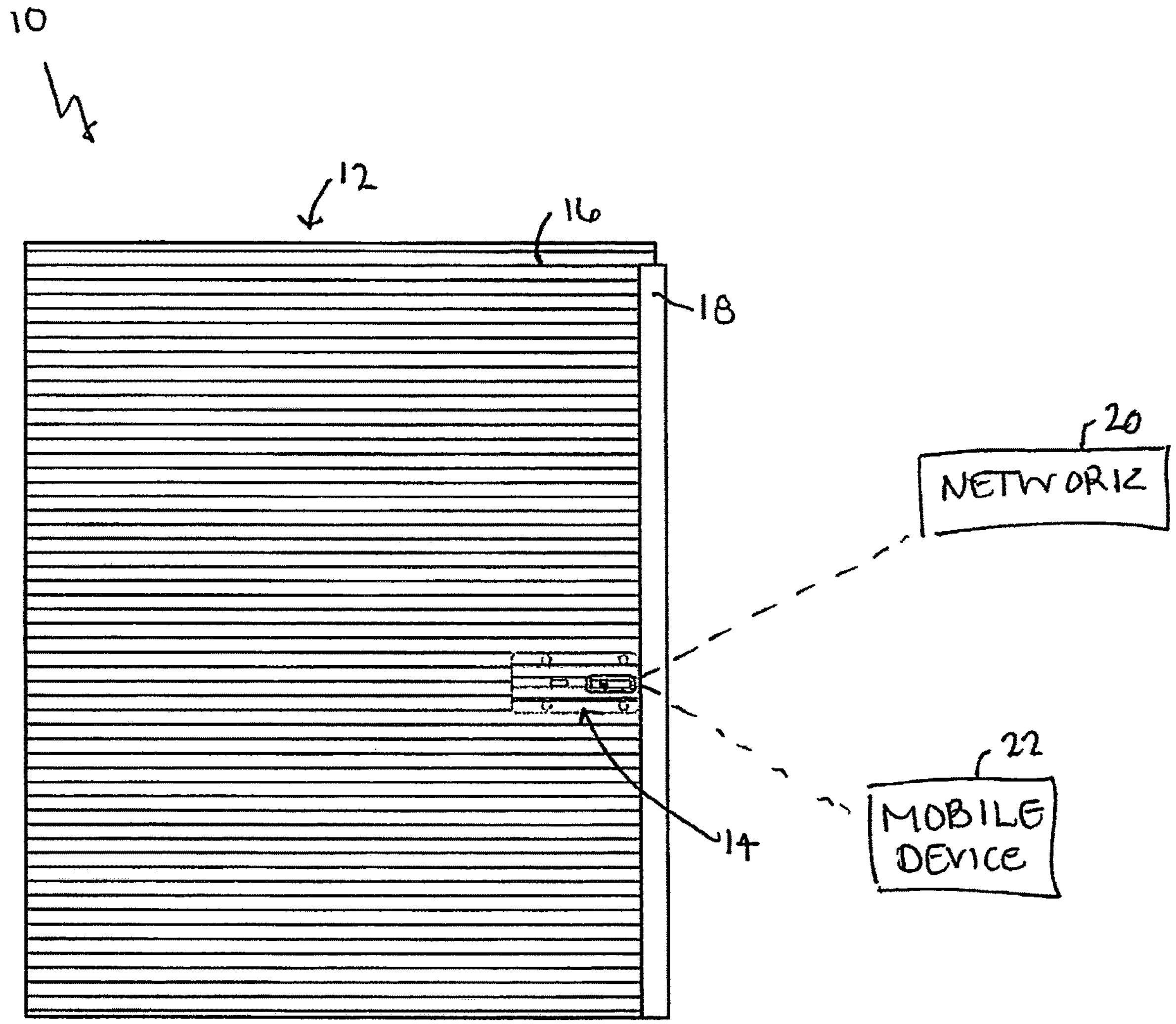
FIG. 1 is a diagrammatic view of a security door system with a lock mechanism in accordance with certain aspects of the present disclosure.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Physical security, for example, for self-storage facilities can present interesting challenges for appropriate access to the storage. One example can include rental self-storage facilities which may rent or lease storage units to users (tenants/lessees), the units being individualized storage rooms that can be secured for each individual tenant. Challenges can arise in maintaining operation of a lock mechanism for a storage unit that is not accessed by the user for a long period of time, for example, in maintaining battery power to the lock mechanism.

In traditional rental storage facilities, rented or leased storage units may not be accessed by the user (lessee) for days, weeks, months, or even years. If such storage units include battery-powered lock mechanisms that communicate with a remote network, other lock mechanisms, or an electronic device, then the battery-powered lock mechanism may run out of battery power before the associated storage unit is accessed by the user. This adds a burden to the owner (lessor) of the storage facility to consistently monitor the battery of the lock mechanisms, ensure that the lock mechanisms are operable, and replace the battery for inoperable lock mechanisms.

Referring now to FIG. 1, a security door system 10 is shown, embodied as an access door to an enclosed space for managing access to storage within the space. The security door system 10 illustratively includes a security door 12 and a lock mechanism 14 for selective operation to block against opening of the security door 12. The security door 12 is illustratively embodied to include as a corrugated roll-up door 16 having the lock mechanism 14 mounted thereto, but in some embodiments, may include any suitable manner of security door. For example, the security door 12 may include a swing door, a folding door, a sliding door, or any other type of suitable door. The security door 12 includes a frame 18 that is configured to be connected with the building structure of the storage unit to remain stationary relative to the door 16 itself, and with which the lock mechanism 14 can selectively engage to block opening of the door 16. In other embodiments, the lock mechanism 14 may be mounted with the frame 18 and selectively engageable with the door 16.

The lock mechanism 14 is illustratively arranged to be selectively in communication with a remote network 20, which may be embodied as the internet, a remote-local network, a cloud network, and/or other suitable communication network(s). Communication between the lock mechanism 14 and the remote network 20 is embodied to be provided directly from individual lock mechanisms 14 but in some embodiments, may be provided via a mesh network (not shown). The lock mechanism 14 may be in communication with a personal mobile device 22, such as a smart phone. Communications with the mesh network, and communications between the lock mechanism 14 and the remote network 20 and/or personal mobile device 22, may be provided via low power Bluetooth, but in some embodiments may include any suitable manner of wireless communications, including but without limitation, infrared, radio frequency, Wi-Fi, Zigbee, 3G/4G/5G, and the like.

Reference is hereby made to U.S. Pat. No. 11,505,967, filed Aug. 24, 2020 for disclosure relating to lock mechanisms in accordance with the present disclosure, including related communications arrangements, which is hereby incorporated by reference herein in its entirety. However, it should be appreciated that lock mechanism 14 may be any lock mechanism suitable for use with door 12 can include aspects which will be described in further detail below.

Figure 2:
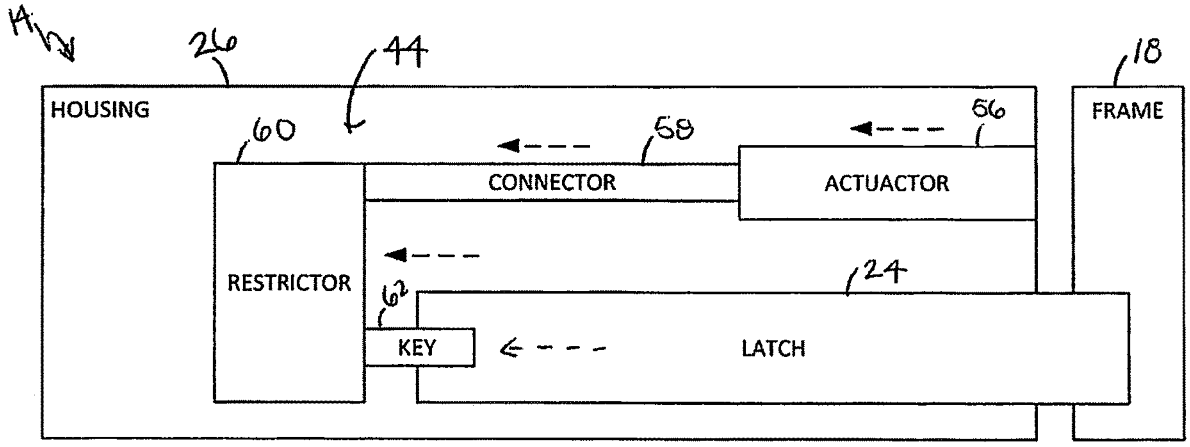
FIG. 2 is a diagram of an exemplary lock mechanism of the security door system of FIG. 1 in accordance with certain aspects of the present disclosure arranged in a locked position.
Figure 3:
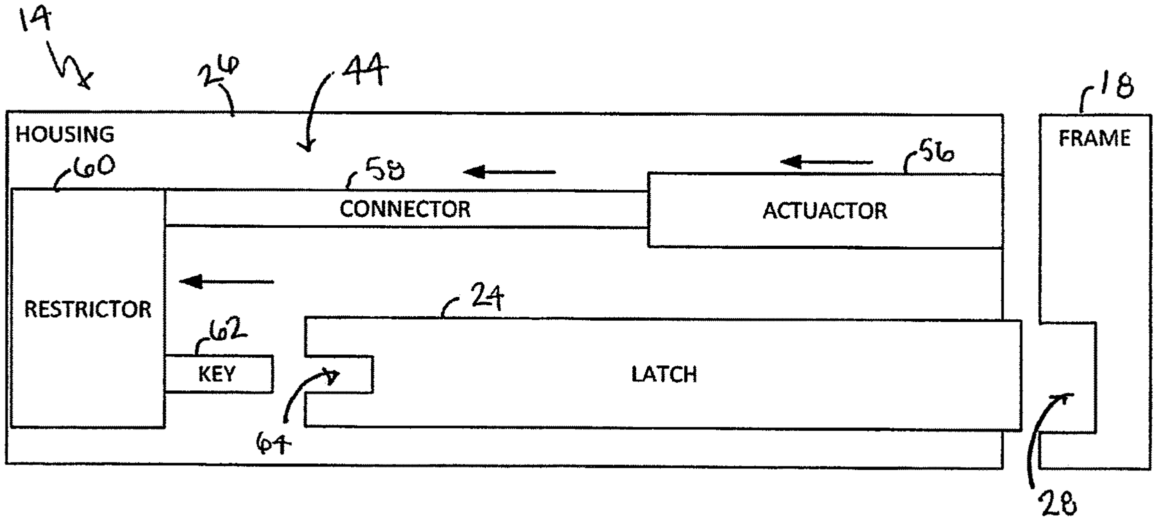
FIG. 3 is a diagram of the exemplary lock mechanism of FIG. 2, showing that a latch has been freed for movement and moved into an unlatched position permitting opening of the door, in accordance with certain aspects of the present disclosure.

In one exemplary embodiment, the lock mechanism 14 includes a latch 24 selectively operable between a locked position, shown diagrammatically in FIG. 2, in which the latch 24 is extended to engage with the frame 18 to block against opening of the security door 12, and an unlocked position, shown diagrammatically in FIG. 3, in which the latch 24 is retracted to disengage from the frame 18 to allow the security door 16 to be opened for access to storage. In the locked position, the latch 24 extends from a housing 26 by a first length to engage with the frame 18 of the security door 12 by penetration into an opening 28 in the frame 18. As discussed in additional detail herein, the lock mechanism 14 is secured with the door 16 such that positioning of the latch 24 within the opening 28 obstructs opening of the door 16 by blocking against vertical movement of the door 16 relative to the frame 18 for opening 28.

Figure 6:
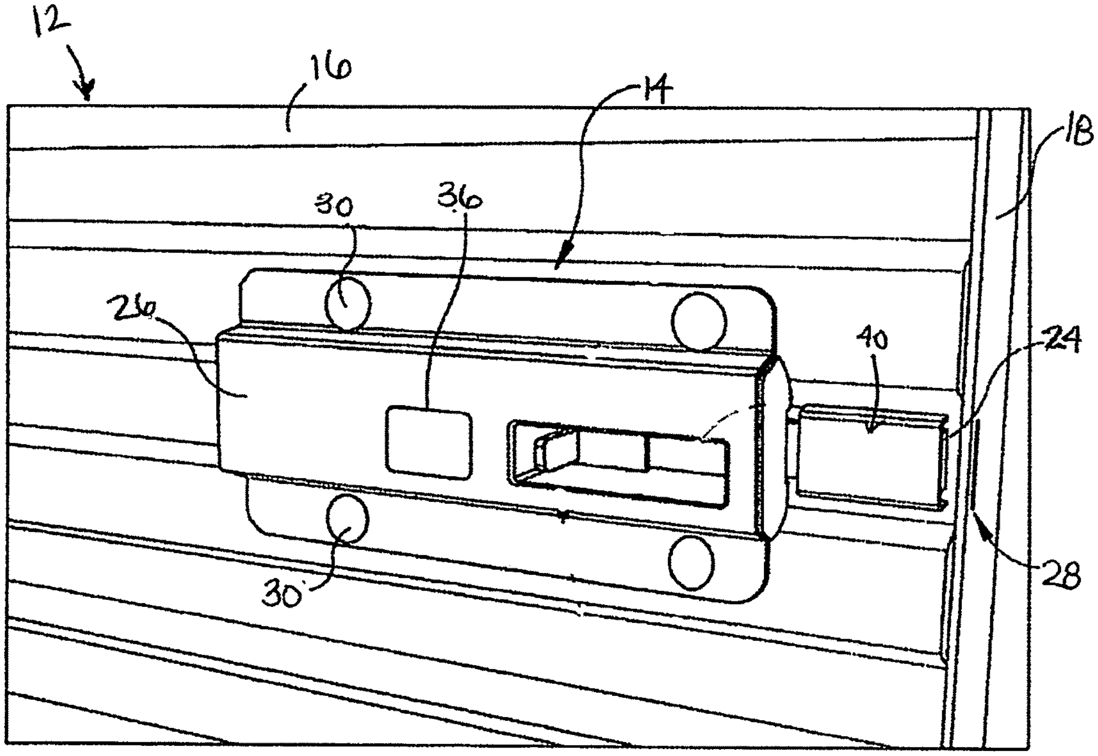
FIG. 6 is a front perspective view of the lock mechanism of the security door system of FIG. 1 in accordance with certain aspects of the present disclosure installed on a corrugated security door.

Referring to FIG. 3, the latch 24 is arranged in the unlocked position, extending from the housing 26 by a second length less than the first length, and disengaged from the opening of the frame 18. The second length may optionally be zero. The lock mechanism 14 illustratively includes the housing 26 which is secured with the door 16 by bolts 30 extending through the door 16, as shown in FIG. 6 and secured by fastening nuts on the interior (secure) side of the door. The housing 26 is illustratively embodied to have a contoured shape with bolt flanges 32 for conforming engagement with the corrugated form of the door 16, although in some embodiments, the housing 26 may take any suitable shape for securing the lock mechanism with the door 16. The housing 26 defines an internal space for arranging components of the lock mechanism 14.

Figure 4:
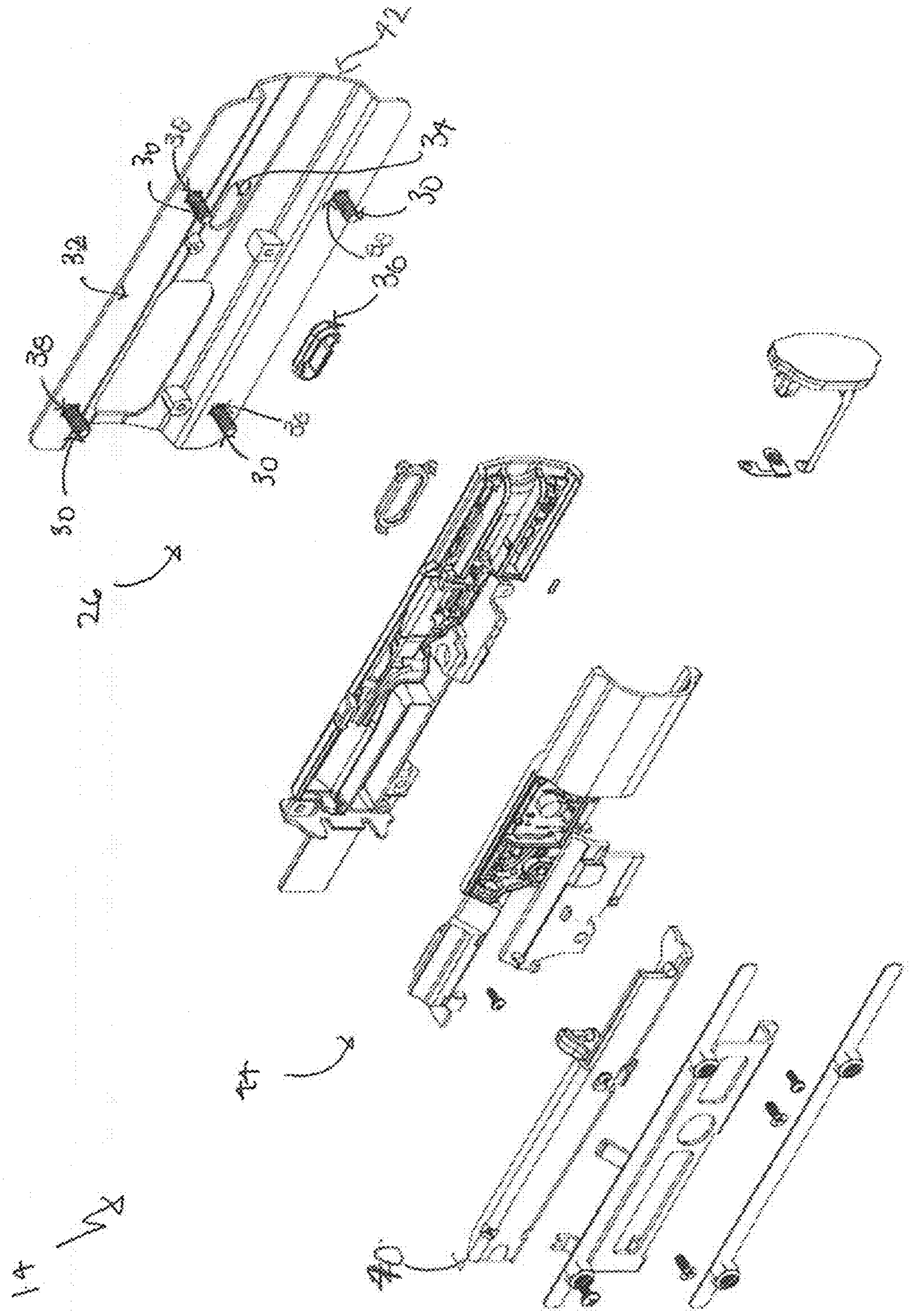
FIG. 4 is an exploded perspective view of the lock mechanism of the security door system of FIG. 1 in accordance with certain aspects of the present disclosure.

Referring now to FIG. 4, the housing 26 may include a button opening 34 for receiving a wake button 36 therethrough for user access, as will be described in further detail below, and a number of fastener openings 38 arranged on the bolt flanges 32 for securing the housing 26 with the door 16. The housing 26 includes a latch support 40 extending from a lateral end and receiving the latch 24 to slidingly extend therethrough for selective engagement with the frame 18. The housing 26 includes an outer body 42 having a U-shaped cross-section connecting on opposite ends with each of the flanges 32.

Figure 5:
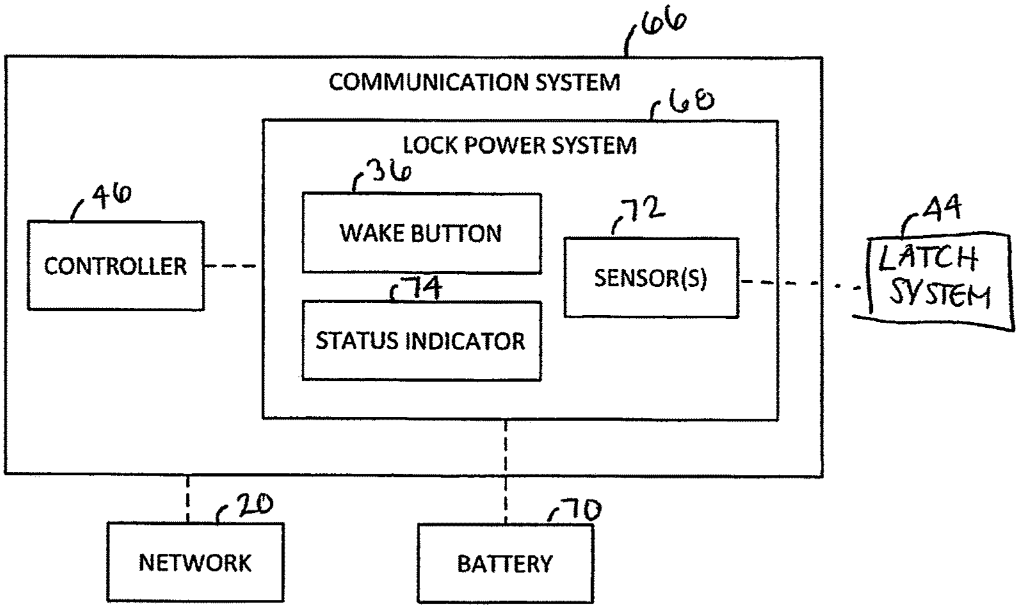
FIG. 5 is a diagram of a communication system of the lock mechanism of the security door system of FIG. 1 in accordance with certain aspects of the present disclosure.

Referring now to FIGS. 2-3 and 5, the lock mechanism 14 also includes a latch system 44 arranged within housing 26 and operable as a restraint to the latch 24. The latch system 44 is selectively operable between a restricted position, shown diagrammatically in FIG. 2, to block against operation of the latch 24 from the locked position and an unrestricted positon, shown diagrammatically in FIG. 3, to permit operation of the latch 24 from the locked position to the unlocked position. The latch system 44 is arranged to selectively restrict movement of the latch 24 according to commands of an onboard controller. The controller sending commands to the latch system 44 is illustratively embodied as a controller 46 of a communication system 66 of the lock mechanism 14, as suggested in FIG. 5 and described in further detail below. In some embodiments the controller of the latch system 44 may be a separate controller communicable with controller 46. The latch system 44 illustratively receives power from an onboard battery 70, as suggested in FIG. 5, although in some embodiments, hardwired power may be provided from the storage facility.

Referring to FIGS. 2-3, the latch system 44 is shown diagrammatically for descriptive ease. The latch system 44 includes an actuator 56, a connector 58 extending from the actuator 56, a restrictor 60, and a lock key 62 arranged to selectively engage with the latch 24. The actuator 56 is illustratively embodied as an electric linear actuator, but in some embodiments, may be any suitable manner of driver or actuator, such as a rotary actuator. In the illustrative embodiment, the connector 58 extends from the actuator 56 to resiliently transfer actuation force from the actuator 56 to drive linear movement of the restrictor 60, also referred to as a slider. The connector 58 is illustratively embodied as a spring formed as a coil for resilient force transfer. The connector 58 is engaged with the restrictor 60 that is arranged for sliding movement relative to the housing 40 to selectively restrict movement of the latch 24 out from the locked position. Motion of the connector 58 drives the restrictor 60 for linear motion between restricted and unrestricted positions of the restrictor 60. In the restricted position, the restrictor 60 is arranged such that the lock key 62 blocks movement of the latch 24 out (leftward) from the locked position to the unlocked position. In the unrestricted position, the restrictor 60 is arranged such that the lock key 62 permits movement of the latch 24 out (leftward) from the locked position to the unlocked position. In some embodiments, the restrictor 60 may not need to engage the lock key 62 in the unrestricted position and the key 62 may be biased away from engagement with the latch 24 when the restrictor 60 is in the unrestricted position, as described in U.S. Pat. No. 11,505,967.

In FIG. 2, the restrictor 60 is shown in a restricted position (rightward) in which the restrictor 60 blocks movement of a lock key 62 out from engagement with the latch 24 to restrict the latch 24 from moving out of the locked position. The lock key 62 is selectively operable between blocked and unblocked positions corresponding with the restricted and unrestricted positions of the latch system 44. In the blocked position of the lock key 62, the lock key 62 engages the latch 24 to restrict or block movement of the latch 24 (leftward) out from the locked position to the unlocked position. In the illustrative embodiment, the lock key 62 engaged with the latch 24 by extension into an opening 64, but in some embodiments the lock key 62 may otherwise abut or obstruct the latch 24.

Referring now to FIG. 3, the restrictor 60 has been driven by the actuator 56 leftward into the unrestricted position to release the lock key 62 for movement into the unblocked position disengaged from the latch 24. In the unblocked position of the lock key 62, the lock key 62 is disengaged with the latch 24, to allow the latch 24 to be shifted leftward out from the locked position into the unlocked position of FIG. 3. Once the lock key 62 is moved into the blocked position (as shown in FIG. 2), the restrictor 60 can be shifted rightward into the restricted position, preventing movement of the lock key 62 out from the blocked position, and thus restricting the latch 24 from movement out of the locked position.

Returning to FIG. 5, the lock mechanism 14 further includes a communication system 66. The communication system 66 is configured to selectively operate the battery 70 and selectively communicate with the network 20. For example, if a predetermined amount of time passes since the latch 24 was put into the locked position, the communication system 66 can operate the battery 70 on low or no power.

As shown in FIG. 5, the communication system 66 comprises a lock power system 68 and the controller 46. The controller 46 illustratively receives power from the onboard battery 70, although in some embodiments, hardwired power may be provided from the storage facility with or without local battery storage. In the illustrative embodiment, the communication system 66 is selectively operable between modes. In a communication mode, the communication system 66 is arranged in full communication with the network 20 to permit remote communication. For example, the communication mode can allow communication of a status of the lock mechanism 14 to the network 20 and can operate the battery 70 at full power. In a hibernation mode, the network communication system 66 is blocked from communicating with the network 20 and the battery 70 may be operated between no power and low power. In such no/low power modes, survival level power can be provided to maintain memory or other minimal needs to preserve the ability to reawaken operation, although non-volatile memory may be applied. In a sleep mode, the network communication system 66 is blocked from communicating with the network 20 and the battery 70 may be operated between low power and full power, as a more robust standby. The amount of power for the battery 70 may be determined by the lessor and/or the manufacturer of the lock mechanism 14. For example, full power may range between about 75%-100% of the battery power and low power may range between about 1% and 75% of the battery power. In other embodiments, full power may be greater than 50% of the battery power and low power may be less than 50% of the battery power. In the illustrative embodiments, low power refers to low amperage draw at standard voltage, although in some embodiments, voltage may be adapted in various modes, for example, 3.7V at full power, 3.3V at low power, and 0.8V at no power, or by further example, low power may be 0.8V particularly where only one lower power mode exists, although any suitable levels may be applied. Additionally or alternatively, in the hibernation mode and/or the sleep mode, the communication system 66 may disconnect the battery 70 altogether from the latch system 44. In some embodiments, the communication mode may be implemented together with only one of the sleep mode or the hibernation mode.

The lock power system 68 is selectively operable between a lock operation mode to permit the latch system 44 to operate between the restricted position and the unrestricted position, and a lock hibernation mode to block the latch system 44 from operating between the restricted position and the unrestricted position. For example, the lock power system 68 in the lock hibernation mode may be disconnected from the latch system 44, specifically the actuator 56, from the battery 70. The lock power system 68, as shown diagrammatically in FIG. 5, includes the wake button 36, one or more sensors 72, and a status indicator 74. The lock hibernation mode of the lock power system 68 may coincide with one or both of the sleep mode and the hibernation mode of the communication system 66, and the lock operation mode of the lock power system 68 may coincide with one or both of the sleep mode and the communication mode of the communication system 66.

The wake button 36 is configured to, when activated by the user, switch the communication system 66 from the hibernation mode (and/or the sleep mode) into the communication mode. The controller 46 may include instructions to, upon activation of the wake button 36, switch the lock power system from the lock hibernation mode to the lock operation mode. In some embodiments, switching of the communication system 66 into one of the communication mode or the sleep mode from a lower power mode (whether via the wake button 36 or otherwise) may switch the lock power system from the lock hibernation mode to the lock operation mode. For example, if the communication system 66 is in a mode other than communication mode, and is still configured to and does receive a selective communication from another device or system, the communication system 66 may automatically switch into one of the communication mode or the sleep mode from a lower power mode without the wake button activation, which may selectively provide the lock power system to switch from the lock hibernation mode to the lock operation mode.

In the illustrative embodiment, the wake button 36 is a mechanical button coupled with the lock housing 26. In other embodiments, the wake button 36 may be a touch sensitive pad (e.g. a capacitive sensor, a pressure sensor) for receiving contact with the user's finger for input of commands, for example, by a single touch or a predetermined series of long and/or short time presses. The wake button 36 may include selective illumination as feedback response, for example, as feedback to user touch to communicate the received touch inputs back to the user and/or as feedback indicating successful and/or unsuccessful change between restricted and unrestricted states by a series of confirming flashes with or without color (such as, but not limited to, green for success, red for failure). In further embodiments, the wake button 36 may be accessible to the user via the mobile device 22 when the user is located within a predetermined physical parameter around the lock mechanism 14.

The one or more sensors 72 may be sensors indicating to the lock power system 68 and/or the communication system 66 the position of any one or more of the latch 24, lock key 62, restrictor 60, and actuator 56, although in some embodiments, such communications may be wireless; moreover motion sensors may be included to detect approach of a user and/or temperature sensors may be included to determine and/or or communicate lock temperatures.

The status indicator 74 is configured to display a status of the lock mechanism 14. In the illustrative embodiment, the status of the lock mechanism 14 displayed on the status indicator 74 may indicate the particular mode of the communication system 66. For example, the status indicator 74 may display that the communication system 66 is in the communication mode, the hibernation mode, or the sleep mode.

In some embodiments, the status of the lock mechanism 14 displayed on the status indicator 74 may indicate the particular mode of the lock power system 68, such as the lock operation mode or the lock hibernation mode. The status of each of the communication system 66 and the lock power system 68 may be shown on one status indicator 74, or, in some embodiments, the lock mechanism 14 may have more than one status indicator 74 to display the status of each of the communication system 66 and the lock power system 68. In some embodiments, the status of only one of the communication system 66 or the lock power system 68 may be displayed on the status indicator 74.

Additionally, the status indicator 74 or an additional status indicator 74 may indicate the position that the latch 24 is in, such as the locked position or the unlocked positon. The status of each of the communication system 66, the lock power system 68, and the latch 24 may be shown on one status indicator 74, or, in some embodiments, separate status indicator 74. In some embodiments, the status of only one or two of the communication system 66, the lock power system 68, and the latch 24 may be displayed on the status indicator 74. Additional statuses that may be displayed on the same status indicator 74 or a separate status indicator 74 include the position of one or more components of the lock mechanism 14 (e.g., the lock key 62, the restrictor 60, and the actuator 56), the connectivity status of the communication system 66 to the network 20, and the power level of the battery 70.

The status indicator 74 is configured to display a status of the lock mechanism 14 during one or more modes of the communication system 66 or the lock power system 68. For example, when both the communication system 66 and the lock power system 68 are in their respective hibernation modes, the lock power system 68 remains connected to (in communication with) the battery 70 while being disconnected from the latch system 44 so that the latch system 44 is disconnected from the lock power system 68, the battery 70, and the network 20. In addition, the communication system 66 is illustratively disconnected from the network 20, at least to the point where some activation sequencing must occur for full communications. Accordingly, the battery life of the battery 70 can be extended during periods of the storage unit not being accessed because the battery 70 is powering limited components of the lock mechanism 14, such as the status indicator 74 and one or more sensors 72 of the lock power system 68.

In addition, when the communication system 66 is in the sleep mode and the lock power system 68 is in the lock hibernation mode, the lock power system 68 remains connected to (in communication with) the battery 70 while being disconnected from the latch system 44 so that the latch system 44 is disconnected from the lock power system 68, the battery 70, and the network 20. In addition, the communication system 66 is disconnected from the network 20. In this arrangement, the battery 70 may operate at a nominally higher power as opposed to when each of the communication system 66 and the lock power system 68 are in their respective hibernation modes.

The status indicator 74 may be coupled with the lock housing 24 and is communicable with the lock power system 68 and the communication system 66. In some embodiments, if the mobile device 22 is within a predetermined perimeter of the lock mechanism 14, the status of the lock mechanism 14 may be displayed on the mobile device 22. In some embodiments, the status indicator 74 may include one or more LED lights. In other embodiments, the status indicator 74 may be an LCD or touch screen.

For example, the status indicator 74 may include three LED lights. The first LED light may indicate the status of the latch 24 by displaying solid green when the latch 24 is in the locked position and blinking green when the latch 24 is in the unlocked position. The second LED light may indicate the status of the communication system 66 by displaying solid blue in the hibernation mode, slow blinking blue in the sleep mode, and fast blinking blue in the communication mode. The third LED light may indicate the status of the lock power system 68 by displaying solid orange in the hibernation mode and blinking orange in the operation mode. In some embodiments, any other suitable combination of colors, blinking, or other patterns may be used to display one or more statuses of the lock mechanism 14. In some embodiments, the hibernation and/or sleep modes may be indicated by no light.

Figure 7:
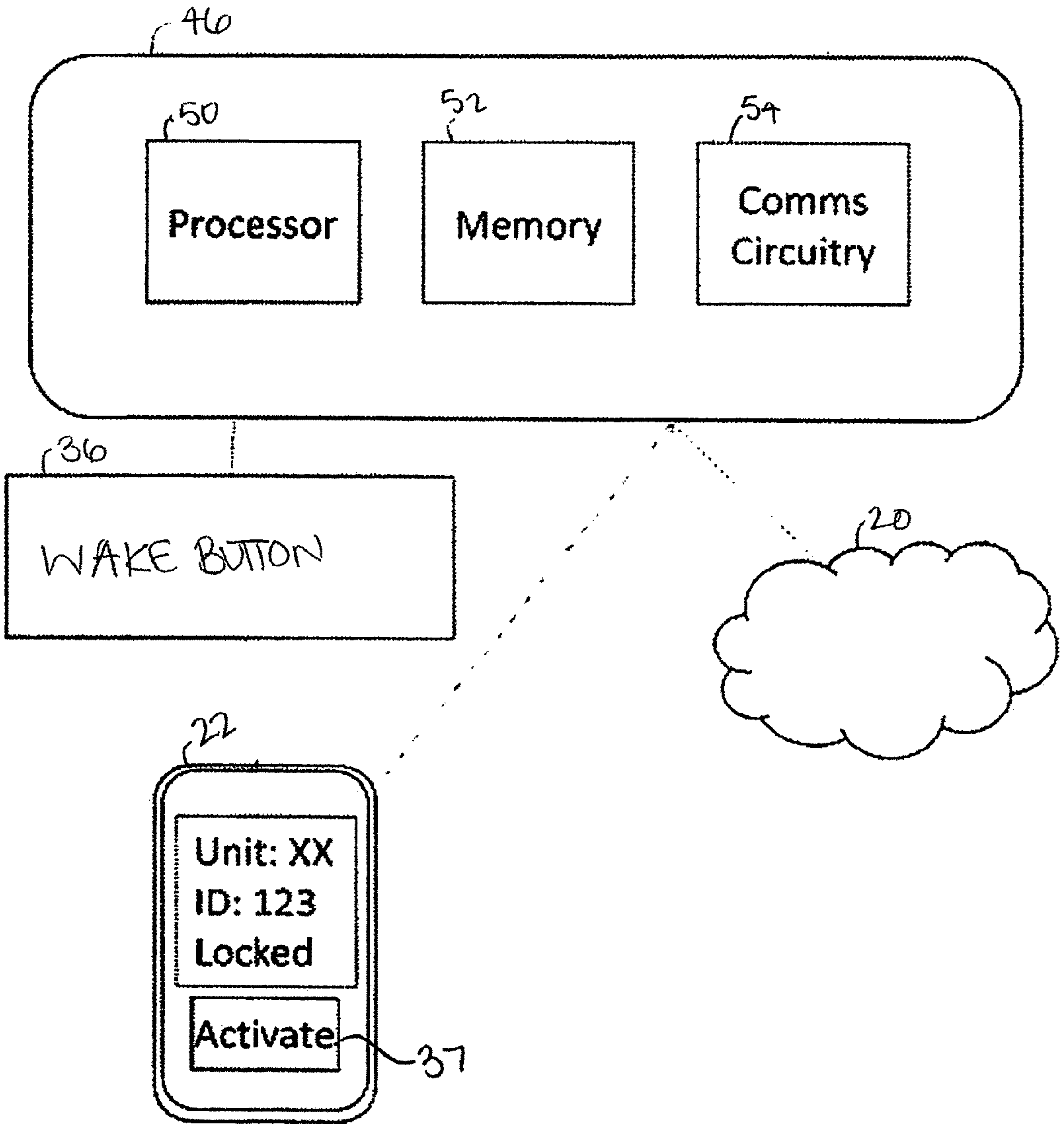
FIG. 7 is a diagram of a controller of the lock mechanism of the security door system of FIG. 1 in accordance with certain aspects of the present disclosure.
Figure 8:
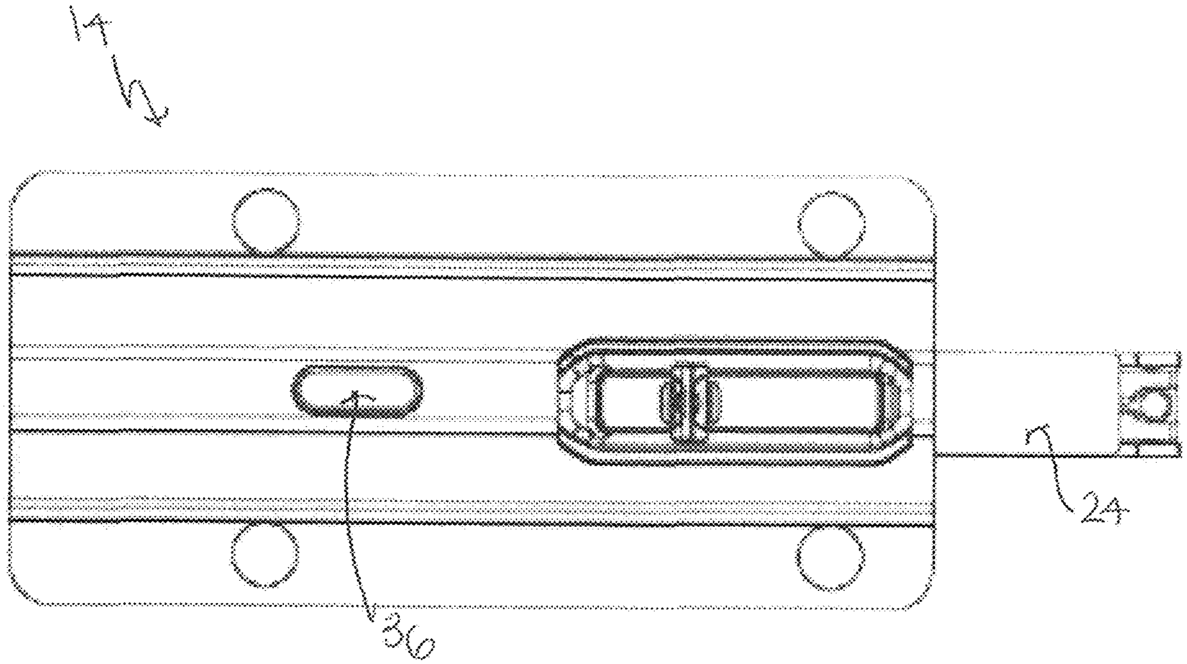
FIG. 8 is a front elevation view of the lock mechanism of the security door system of FIG. 1 in accordance with certain aspects of the present disclosure.
Figure 9:
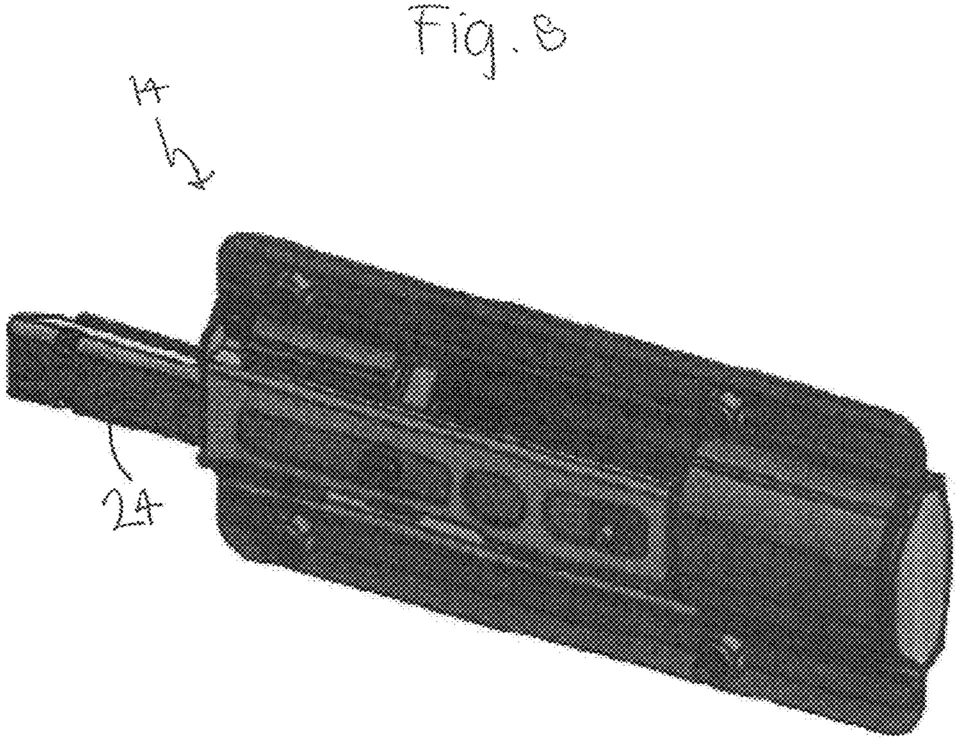
FIG. 9 is a rear perspective view of the lock mechanism of the security door system of FIG. 1 in accordance with certain aspects of the present disclosure.

Referring now to FIG. 7, a diagram of the controller 46 is shown. The controller 46 illustratively includes a processor 50 for executing instructions stored on a memory 52 to send commands and/or receive input via communications circuitry 54. The processor 50 is illustratively embodied as a microprocessor, but in some embodiments, may include any suitable computing device. The memory 52 is illustratively embodied as a flash memory, but in some embodiments, may include any suitable form of memory. The controller 46 is illustratively arranged in hardwired communication with the wake button 36 to receive user inputs, and with sensors 72 of the lock mechanism 14, for example, position sensors indicating to the controller 46 position of various components of the lock mechanism 14 as described in further detail above. Although in some embodiments, such communications may be wireless; moreover motion sensors may be included to detect approach of a user and/or temperature sensors may be included to determine or communicate lock temperatures. The controller 46 may be arranged to be communicable with one or more of personal mobile devices 22, one or more mesh networks of other lock mechanisms (not shown), and one or more remote networks 20 such as the internet, via the communications circuitry 54. The communications circuitry 54 is represented by a single element in FIG. 7, but can represent any number of components suitable for wired and/or wireless communications via one or more communications protocols.

In some embodiments, the controller 46 may include instructions to switch the communication system 66 to the sleep mode from the communication mode after a first predetermined period of time has passed since the latch 24 was switched from the unlocked position to the locked position. The first period of time may be one or more minutes, one or more hours, one or more days, one or more weeks, or one or more months. Additionally, the controller 46 may include instructions to switch the communication system 66 from the sleep mode to the hibernation mode after a second predetermined period of time has passed since the latch 24 was switched from the unlocked position to the locked position. The second period of time may be longer than the first period of time. For example, the first period of time may be one month and the second period of time may be six months. In some embodiments, the first period of time may be shorter or longer than one month and the second period may be shorter or longer than six months. Each of the first period of time and the second period of time can be predetermined by the manufacturer or the lessor.

In some embodiments, the controller 46 may include instructions to switch the communication system 66 to the sleep mode from the communication mode after a third predetermined period of time has passed since the latch 24 was switched from the locked position to the unlocked position, and to switch the communication system from the sleep mode to the hibernation mode after a fourth predetermined period of time has passed since the latch was switched from the locked position to the unlocked position. The third period of time may be shorter, longer, or equal to the first period of time, and the fourth period of time may be shorter, longer, or equal to the second period of time. For example, the third period of time may be one week and the fourth period of time may be one month. In some embodiments, the third period of time may be shorter or longer than one week and the fourth period of time may be shorter or longer than one month. Each of the third period of time and the fourth period of time can be predetermined by the manufacturer or the lessor.

In some embodiments, the controller 46 may include instructions to switch the lock power system 68 from the lock operation mode to the lock hibernation mode after one of the first, second, third or fourth period of time. In some embodiments, the controller 46 may include instructions to switch the lock power system 68 to the lock hibernation mode simultaneously when the communication system 66 is switched to the sleep mode and/or the hibernation mode.

To operate the lock mechanism 14 via mobile device 22, the user may address the lock mechanism 14 while the systems 66, 68 are in their respective hibernation or sleep modes, and can touch the wake button 36 to awaken the lock mechanism 14 for communication with the network 20. For example, the lock mechanism 14 may connect with the personal mobile device 22. Once activated and connected with the network 20, the lock mechanism 14 can enable the lock control system 44 to move the restrictor 60 into the unrestricted position. The user may now move the latch 24 from the locked position into the unlocked position. The actuator 56 may default to bias the restrictor 60 towards the restricted position, for example, by timing out after 2 seconds from arrangement of the latch 24 in the unlocked position which may be detected via position sensor.

The lock mechanism 14 can enable overlock by the owner (lessor). The owner may communicate with individual lock mechanisms 14 to activate and/or deactivate user access. The owner may communicate with individual lock mechanisms 14 via the remote network 20, mesh network, or direct communication by a control interface platform such as an application interface of a computing device. By selecting, confirming, and/or entering identifying information on such an application interface regarding the particular lock mechanism 14, the owner can be presented with an activation button 76 to toggle overlock controls between activated and deactivated states as desired. In the activated state, the overlock enables user access as discussed herein. In the activated state, the overlock can disable user access by disabling the user operation of the latch operator 48 via the personal mobile device 22 and/or activation button 37.

Devices, systems, and methods within the present disclosure may include an electromechanical locking device (lock) which can be attached to a roll-up door allowing tenants to secure their belongings without the need of a padlock. The lock may be opened via one or more of three methods: smart-device app (such as, but not limited to, via Bluetooth), wireless fob (such as, but not limited to, radio frequency), and/or quick-click code (such as, but not limited to, touch the user interface of the lock with a predetermined series of short and long presses). In illustrative embodiments, the lock may be opened via an attached keypad. The lock can also be used by the site-operator to overlock tenants, such as those tenants who do not make timely rent payments.

The lock may be battery-powered and may communicate via direct connection between lock and smart-device or via a wireless mesh network. In illustrative embodiments, the lock may be hard-wired for power and/or communication.

Traditional access control for locks, such as storage unit door locks, is generally hard-wired. Installing and/or maintaining such hardwired lock arrangements can be time and/or resource consuming process which can drive high expense. Other difficulties may arise in implementing wired solutions on existing facilities.

Devices, systems, and methods within the present disclosure may lessen the problems of traditional lock systems. For example, padlocks can be troublesome if users forget and/or lose keys or combinations. Padlocks can be subverted by cutting with bolt cutters. Moreover, traditional padlocks do not ordinarily communicate remotely, for example, of their status with site operators. Traditional padlock-style overlocks can require separate and/or additional locks. Traditional locks attached to the building like normal access control systems can be difficult and/or expensive in installation, and/or can generally require opening each door at a site and/or at the same time because waiting for a unit to become vacated could require an installer to come to site one-at-a-time creating very high installation costs. Moreover, existing overlocking devices on doors may lack networking (such as, but not limited to, mesh-enabled) and may not easily report status to the site operator, and/or may not be designed for simple locking but only for overlocking.

Devices, systems, and methods within the present disclosure may be easily installed by removing (four) bolts on an existing hasp and replacing the existing hasp with the locking mechanism 14 of the present disclosure using the same bolts and bolt pattern. Such arrangements can create a simple installation, and/or can allow for rolling additions to the system as tenants move out. Such arrangements may provide both simple locking and/or overlocking operation by a solitary unit. Such arrangements may provide constant communication of its status, for example, via a two-way mesh network. Such communication can provide remote locking, remote unlocking, remote and/or automated overlocking, remote removal of overlock without ever involving a site employee, reporting of temperature of unit, motion detection inside and/or outside the unit using infrared sensors.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

What is claimed is:

1. A self-storage lock for a corrugated self-storage door, the self-storage lock comprising:

a lock housing for mounting to the self-storage door or to a storage frame supporting the self-storage door; and a lock mechanism arranged within the lock housing, the lock mechanism comprising a latch selectively operable between a locked position in which the latch is extended to engage with the other of the self-storage door and storage frame to block against opening of the self-storage door, and an unlocked position in which the latch is retracted to disengage from the other of the self-storage door and storage frame to allow the self-storage door to be opened for access to self-storage, and a communication system selectively operable between a communication mode in which the communication system communicates with a network to permit remote communication for a status of the lock and a hibernation mode in which the communication system is blocked from communicating with the network and operates with at least some power, wherein the communication system is also selectively operable in a sleep mode in which the communication system operates at a power lower than the power in the communication mode but higher than the power in the hibernation mode, wherein the communication system includes a wake button configured to, when activated, switch the communication system from the hibernation mode to the communication mode.

2. The self-storage lock of claim 1, wherein the storage lock further comprises a status indicator coupled with the lock housing and communicable with the communication system, the status indicator being configured to display the status of the storage lock.

3. The self-storage lock of claim 2, wherein the status indicator displays the status of the self-storage lock in each of the communication mode and the hibernation mode.

4. The self-storage lock of claim 1, wherein the communication system includes sensor communicable with the communication system to communicate whether the latch is in the locked position or the unlocked position.

5. The self-storage lock of claim 4, wherein the status of the self-storage lock includes at least one of: the mode that the communication system is in, the position that the latch is in, and whether the communication system is connected to the network.

6. The self-storage lock of claim 1, wherein the wake button is a button coupled with the lock housing of the self-storage lock and operable by a user.

7. The self-storage lock of claim 1, wherein the communication system includes a controller having a processor and a memory storing instructions to, when executed by the processor, communicate the status of the self-storage lock to the network when the communication system is in the communication mode.

8. The self-storage lock of claim 7, wherein the self-storage lock further comprises a status indicator coupled with the lock housing and configured to display the status of the self-storage lock, and the memory further stores instructions to, when executed by the processor, communicate the status of the lock to the status indicator when the communication system is in each of the communication mode and the hibernation mode.

9. The self-storage lock of claim 8, wherein the communication system includes a sensor configured to detect whether the latch is in the locked position or the unlocked position.

10. The self-storage lock of claim 8, wherein the memory further stores instructions to, when executed by the processor, switch the communication system from the communication mode to the hibernation mode after a predetermined amount of time has passed since the latch was switched into the locked position.

11. A self-storage security door system comprising:

a self-storage security door including a door and a frame; and, a lock secured with one of the door and the frame, the lock comprising a latch selectively operable between a locked position in which the latch is engaged with the other of the door and the frame to block against opening of the door, and an unlocked position in which the latch is disengaged from the other of the door and the frame to allow the self-storage security door to be opened for access to storage, and a communication system selectively operable between a communication mode in which the communication system communicates with a network to permit remote communication and a hibernation mode in which the communication system is blocked from communicating with the network and operates with at least some power, wherein the communication system is also selectively operable in a sleep mode in which the communication system operates at a power lower than the power in the communication mode but higher than the power in the hibernation mode.

12. The self-storage security door system of claim 11, wherein the communication system includes a wake button configured to, when activated, switch the communication system from the sleep mode to the communication mode.

13. The self-storage security door system of claim 12, wherein the lock further comprises a status indicator coupled with the lock housing and communicable with the communication system, the status indicator being configured to display the status of the lock.

14. The self-storage security door system of claim 13, wherein the status indicator displays the status of the lock in each of the communication mode and the sleep mode.

15. The self-storage security door system of claim 12, wherein the wake button is a button coupled with the lock housing of the lock and operable by a user.

16. The self-storage security door system of claim 12, wherein the communication system includes a controller having a processor and a memory storing instructions to, when executed by the processor, communicate the status of the lock to the network when the communication system is in the communication mode.

17. The self-storage security door system of claim 16, wherein the lock further comprises a status indicator coupled with the lock housing and configured to display the status of the lock, and the memory further stores instructions to, when executed by the processor, communicate the status of the lock to the status indicator when the communication system is in each of the communication mode and the hibernation mode.

18. The self-storage security door system of claim 17, wherein the communication system includes sensor configured to detect whether the latch is in the locked position or the unlocked position.

19. The self-storage security door system of claim 17, wherein the memory further stores instructions to, when executed by the processor, switch the communication system from the communication mode to the hibernation mode after a predetermined amount of time has passed since the latch was switched into the locked position.

* * * * *